United States Patent [19]

Monahan

[11] Patent Number: 4,722,503
[45] Date of Patent: Feb. 2, 1988

[54] DISPLAY RAMP

[75] Inventor: James E. Monahan, Madison, Conn.

[73] Assignee: Larsen Marketing, Inc., Guilford, Conn.

[21] Appl. No.: 57,633

[22] Filed: Jun. 4, 1987

Related U.S. Application Data

[63] Continuation of Ser. No. 904,664, Sep. 8, 1986, abandoned.

[51] Int. Cl.⁴ ............................................. A47F 7/00
[52] U.S. Cl. ..................................... 248/346; 211/13; 211/24; 211/182; 248/188.8; 403/319
[58] Field of Search .............. 211/13, 24, 182, 192; 248/346, 188.8, 188.9, 127, 159; 403/315, 316, 319, 109

[56] References Cited

U.S. PATENT DOCUMENTS

| 4,040,521 | 8/1977 | Fitzpatrick | 211/24 |
| 4,121,893 | 10/1978 | Morissette | 403/319 X |
| 4,343,401 | 8/1982 | Paulyson | 206/335 X |
| 4,550,835 | 11/1985 | Lynch | 211/24 |

OTHER PUBLICATIONS

A brochure of Larsen Marketing, Inc. showing a prior art Display Ramp.

Primary Examiner—Robert W. Gibson, Jr.
Attorney, Agent, or Firm—Costas and Montgomery

[57] ABSTRACT

An elevated display ramp for an automotive vehicle constructed of parallel hollow rods in joinable sections where adjoining sections are aligned through common nipples and tabs and joined rods are locked together to securely and safely lock elevated sections together. The elevated sections are supported on trestles of varying height which determine the angle of the elevated sections.

2 Claims, 4 Drawing Figures

U.S. Patent  Feb. 2, 1988  4,722,503
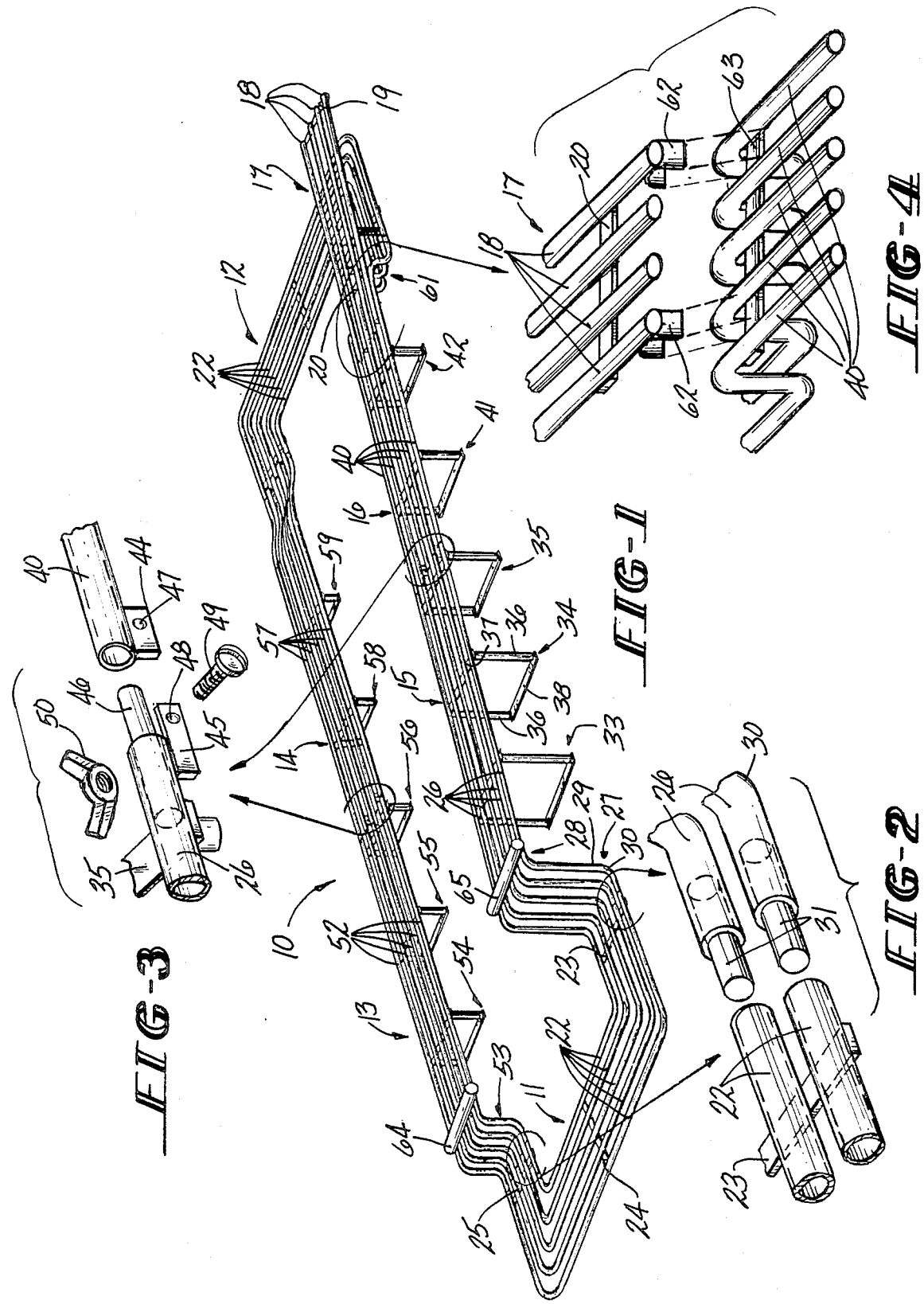

DISPLAY RAMP

RELATED APPLICATION

This is a continuation of application Ser. No. 904,664 filed Sept. 8, 1986, now abandoned.

FIELD OF THE INVENTION

This invention relates to a display ramp for automobiles for use at point of sale.

BACKGROUND OF THE INVENTION

Display ramps for automobiles have been previously known in which the automobile is elevated with one side above the other to elevate and cant the automobile so that a prospective purchaser may easily view the interior, and also a reflective sheet or mirror may be placed under the automobile to let the prospective buyer view the underside.

The previous devices have generally comprised demountable sections, each section comprising a plurality of parallel rod-like members with legs thereunder to support the two sides of the ramp at different heights. Typically, the sections utilize a nipple which is inserted into the ends of the sections to be joined without any positive connection. This can lead to loosening and possible separation of the sections under repeated use. Moreover, the legs used on the previously known ramps are merely hollow vertical rods which will tend to die cut the carpeting of a showroom.

Accordingly, the present invention provides a new and improved automobile display ramp which overcomes the above discussed problems.

SUMMARY OF THE INVENTION

Briefly stated, the invention in one form thereof, comprises a display ramp which is formed in seven sections. Each section comprises a plurality of spaced apart parallel hollow rod members which are joined together in fixed space relation. Four of the section are straight sections resting on trestles of progressively greater height from one end thereof to the other. The side sections include end portions which rest on a floor while the end sections are generally U-shaped and maintain the side ramp sections in fixed relation.

The trestle supports are generally rectangular and include an upper portion which spaces the rods of the side sections; two elevating legs; and a bottom member extending between the two legs and transferring the weight of the ramp and a vehicle thereon to the support surface. The seventh section is a removable section.

An object of this invention is to provide an easily assembliable automobile display ramp of the type described, in which the sections may be securely locked together to prevent inadvertent disassembly.

A further object of this invention is to provide a new and improved support system for the elevated side rails of a vehicle display ramp of the type described.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIG. 1 is a perspective view of an automobile display ramp embodying the invention;

FIG. 2 is an enlarged view in perspective of the indicated area in 1;

FIG. 3 is an enlarged perspective view of the area indicated in FIG. 1; and

FIG. 4 is an enlarged and exploded perspective view of the indicated in area FIG. 1.

DETAILED DESCRIPTION OF PREFERRED EMBODIMENT OF THE INVENTION

An automobile display ramp 10 embodying the invention comprises seven sections indicated as 11-17. The seven sections are shown in an assembled condition and the sections are delineated by broken lines. Section 17 is a removable slope section which is merely intended to provide a means of lifting an automobile to be driven onto the ramp. Section 17 comprises four spaced apart rod members 18 joined together in parallel fixed relation by cross members 19 and 20. The ends 21 of the rods 18 rest on a cross member (not shown in FIG. 1) on section 16, and the cross member 19 rests on the floor. The end sections 11 and 12 are identical and comprise, as shown, five parallel spaced apart rod members 22, which are joined together in parallel relationship by cross members 23, 24, and 25.

Section 15 also has five spaced apart hollow rod-like members 26 which are formed with a generally S-shaped end 27, having a first bend 28 into substantially vertical portion 29 and then a substantially right angle bend 30 to provide horizontal ends to mate with the rods 22 of end section 11. Both rods 22 and 26 are of the same inside and outside diameters.

Received in the ends of rods 26 of section 15 after the bend 30, are nipples 31 (FIG. 2) which telescopically fit into the rods 22 at one end of end section 11. The nipples 31 have a very tight fit with both rods 26 and 22. Inasmuch as the weight on section 15 at the end joined to section 11 is on the rods 26 and transmitted to the floor, it is not necessary to have a secured connection between the rods 26 and the rods 22. Section 15 is further supported on three trestle-type supports 33, 34 and 35.

In fabrication, each of the trestle supports are formed with two legs 36 and upper cross member 37, and a lower cross member 38. The trestles are preferably welded and then the upper cross member 37 is welded to each of the rods 26 of section 15. The dimension of legs 36 of each trestle are selected in accordance with the desired incline.

Section 16, which comprises the five parallel rod members 40, is supported on trestles 41 and 42. The trestles are of varying height from trestle 42 to trestle 33, so that sections 15 and 16 will reside in a common plane.

It is important that the sections 15 and 16 be securely fastened. To this end, a tab 44 is welded to the ends of at least two of rods 40, and a tab 45 is welded to at least two of the mating rods 26 of section 15. Then a nipple 46 having a very tight fit is inserted into the corresponding ends of rods 26 and 40, which are then pulled to have their ends in abutting relationship. At this time, an aperture 47 in tab 44, and an aperture 48 in tab 45 are aligned. The tabs 44 and 45 on rods 40 and 26, respectively, are slightly offset so that when the ends of rods 26 and 40 are joined, the tabs may slide adjacent each other. Tabs 45 extend past the end of rods 26 a distance selected so that apertures 45 and 44 are in alignment when the ends of rods 26 and 40 abut. Then the at least two abutting rods are rigidly secured by passing a bolt 49 through the apertures 44 and 45 and engaging the end of the bolt with a securing means shown in the form of a wing nut 50.

Section 13 comprises five spaced apart parallel rods 52 which are formed at the left end thereof, as shown, in a general S-shape 53, the same as S-shape 27 of section 15. Rods 52 terminate in short horizontal portions which abut rods 22 of section 11. Section 13 is supported by trestles 54, 55 and 56, as well as the ends of rods 52 as shown at the left end thereof.

Section 14 comprises five parallel rod members 57 supported on trestles 58 and 59. The end of rods 52 and 57 of sections 13 and 14 are joined in the same manner as the ends of the rods 26 and 40 of sections 15 and 16, as illustrated in FIG. 3. At least two of the mating rods 52 and 57 have the connection shown in FIG. 3.

The ends of rods 57 of section 14 at the right side thereof, as shown in FIG. 1, are formed with a slow S form to bring the rods 57 to engagement with the floor on horizontal portions thereof. The rods 22 of section 12 are joined to the rods 57 of section 14 in the same manner as explained in FIG. 2. Similarly, the ends of the rods 40 of section 16, as shown at the right hand side thereof, are formed in a general S-shape 61 to bring the rods to a position of support on the floor where they are joined to the rods 22 of section 12 in the same manner as described and illustrated in FIG. 2.

Slope section 17 includes two inverted U-shape clips 62 welded to the two outer rods 18 designed to fit over cross member 63 on section 16 with rods 18 fitting between rods 40 as shown in FIG. 4.

The construction as described provides a ramp which will elevate and cant a vehicle for display so that a prospective purchaser may easily look inside of the car without bending over.

The trestle-type supports provide a rigid coupling of the spaced apart rods and further provide a large bearing area for each of the trestles so as not to die cut or otherwise mar carpeting in an automobile showroom.

In operation, the sections of the ramp are assembled in the manner described and the slope section 17 is laid in place on section 16. Then a vehicle is driven onto ramp sections 13, 14, 15, and 16; the emergency brake is secured; and the slope section 17 is removed for esthetic purposes. Wheel stops 64 and 65 are welded across the rods of sections 13 and 15 to warn the driver that the end of the ramp has been reached when either driving a car onto the ramp or backing it onto the ramp.

Preferably, the ramp is made of stainless steel rod of approximately one inch outside diameter, as are the legs of the trestles. The nipples 31 and 46 are selected to be of a diameter which has a very tight fit with the inside diameter of the rods.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart form the spirit and scope of the invention.

Having thus described the invention, what is claimed is:

1. An elevated display ramp for an automobile, which comprises two end sections adapted to rest on a support surface, said end sections comprising a multiplicity of spaced apart parallel hollow tubular members joined together by strips perpendicular thereto, said end sections being of generally U-shape, two side sections for each side, each comprising a like plurality of similarly spaced apart parallel hollow tubular members, each of said side sections being adapted to rest on the support surface at one end thereof and including trestle support members arranged to rest on the support surface, nipples secured in the tubular members of one of said end sections and said side sections at the outer ends of said end sections arranged to couple said tubular members of adjoining sections, one of said side sections on either side carrying a nipple in at least one tubular member arranged to be received in a mating tubular member of the other side section, said at least one tubular member of said one side section having an exterior tab extending toward a mating tubular member of said other section, said other of said side sections having an exterior tab arranged to mate with said extending tab, both of said tabs having apertures therethrough whereby said tabs may be secured together to clamp said sections together.

2. The display ramp of claim 1 where said trestles comprise a cross member secured to said tubular members of a side section, two spaced apart vertical legs attached to said cross member and a bottom member secured to said vertical legs at the bottom thereof and supporting said side sections on the support surface.

* * * * *